United States Patent [19]

Bird, Jr. et al.

[11] 3,761,903

[45] Sept. 25, 1973

[54] REDUNDANT OFFSET RECORDING

[75] Inventors: George L. Bird, Jr.; Way Dong Woo, both of Waltham, Mass.

[73] Assignee: Kybe Corporation, Waltham, Mass.

[22] Filed: Nov. 15, 1971

[21] Appl. No.: 198,786

[52] U.S. Cl. .................. 340/174.1 G, 340/146.1 BE

[51] Int. Cl. .................. G11b 5/02

[58] Field of Search .............. 340/174.1 B, 174.1 G, 340/174.1 H, 146.1 BE

[56] References Cited

UNITED STATES PATENTS

| | | | |
|---|---|---|---|
| 3,264,623 | 8/1966 | Gabor | 340/146.1 BE |
| 3,409,875 | 11/1968 | Jager et al. | 340/146.1 BE |
| 2,628,346 | 2/1953 | Burkhart | 340/146.1 BE |
| 3,195,048 | 7/1965 | Adams et al. | 340/146.1 BE |
| 3,060,273 | 10/1962 | Nowak et al. | 340/146.1 BE |
| 3,303,482 | 2/1967 | Jenkins | 340/146.1 BE |
| 3,633,162 | 1/1972 | Findeisen | 340/174.1 B |

*Primary Examiner*—Vincent B. Canney
*Attorney*—Herbert W. Kenway et al.

[57] ABSTRACT

Information is recorded on a record medium for recovery without loss due to a defect of the medium by recording the same information in each of two tracks with a longitudinal offset; and upon detection of an error while reading from one track, switching to reread the same item of information from the other track.

17 Claims, 29 Drawing Figures

| | | | | | | | | | |
|---|---|---|---|---|---|---|---|---|---|
| X | 1 | 0 | 0 | 0 | ••• | 0 | 0 | 0 | |
| Y | 1 | 0 | 0 | 0 | ••• | 0 | 0 | 0 | INITIALIZE |
| D | 0 | 0 | 0 | 0 | ••• | 0 | 0 | 0 | |
| | 200 | 199 | 198 | 197 | ••• | 3 | 2 | 1 | |

Fig. 6A.

| | | | | | | | | | |
|---|---|---|---|---|---|---|---|---|---|
| X | 1 | 1 | 0 | 0 | ••• | 0 | 0 | 0 | |
| Y | 0 | 1 | 0 | 0 | ••• | 0 | 0 | 0 | LOAD A1 |
| D | A1 | 0 | 0 | 0 | ••• | 0 | 0 | 0 | |
| | 200 | 199 | 198 | 197 | ••• | 3 | 2 | 1 | |

Fig. 6B.

| | | | | | | | | | |
|---|---|---|---|---|---|---|---|---|---|
| X | 1 | 1 | 1 | 0 | ••• | 0 | 0 | 0 | |
| Y | 1 | 0 | 1 | 0 | ••• | 0 | 0 | 0 | RECIRCULATE |
| D | 0 | A1 | 0 | 0 | ••• | 0 | 0 | 0 | |
| | 200 | 199 | 198 | 197 | ••• | 3 | 2 | 1 | |

Fig. 6C.

| | | | | | | | | | |
|---|---|---|---|---|---|---|---|---|---|
| X | 1 | 1 | 1 | 1 | ••• | 0 | 0 | 0 | |
| Y | 1 | 0 | 1 | 0 | ••• | 0 | 0 | 0 | LOAD A2 AND RECIRCULATE |
| D | 0 | A2 | 0 | A1 | ••• | 0 | 0 | 0 | |
| | 200 | 199 | 198 | 197 | ••• | 3 | 2 | 1 | |

Fig. 6D.

| | | | | | | | | | |
|---|---|---|---|---|---|---|---|---|---|
| X | 1 | 1 | 1 | 1 | ••• | 1 | 1 | 1 | |
| Y | 0 | 1 | 0 | 1 | ••• | 1 | 0 | 1 | RECORD A LOADED |
| D | A100 | 0 | A99 | 0 | ••• | 0 | A1 | 0 | |
| | 200 | 199 | 198 | 197 | ••• | 3 | 2 | 1 | |

Fig. 6E.

| | | | | | | | | | |
|---|---|---|---|---|---|---|---|---|---|
| X | 0 | 0 | 0 | 0 | ••• | 0 | 0 | 0 | |
| Y | 0 | 1 | 0 | 1 | ••• | 1 | 0 | 1 | WRITE AND RECIRCULATE |
| D | A100 | 0 | A99 | 0 | ••• | 0 | A1 | 0 | |
| | 200 | 199 | 198 | 197 | ••• | 3 | 2 | 1 | |

Fig. 6F.

| | | | | | | | | | |
|---|---|---|---|---|---|---|---|---|---|
| X | 0 | 0 | 0 | 0 | ••• | 0 | 0 | 0 | |
| Y | 0 | 0 | 1 | 0 | ••• | 0 | 1 | 0 | FIRST SHIFT |
| D | 0 | A100 | 0 | A99 | ••• | A2 | 0 | A1 | |
| | 200 | 199 | 198 | 197 | ••• | 3 | 2 | 1 | |

Fig. 6G.

| | | | | | | | | | |
|---|---|---|---|---|---|---|---|---|---|
| X | 1 | 0 | 0 | 0 | ••• | 0 | 0 | 0 | |
| Y | 1 | 0 | 0 | 1 | ••• | 1 | 0 | 1 | SECOND SHIFT |
| D | A1 | 0 | A100 | 0 | ••• | 0 | A2 | 0 | |
| | 200 | 199 | 198 | 197 | ••• | 3 | 2 | 1 | |

Fig. 6H.

| | 200 | 199 | 198 | 197 | ••• | 3 | 2 | 1 |
|---|---|---|---|---|---|---|---|---|
| X | 1 | 1 | 0 | 0 | ••• | 0 | 0 | 0 |
| Y | 0 | 1 | 0 | 0 | ••• | 0 | 1 | 0 |
| D | B1 | A1 | 0 | A100 | ••• | A3 | 0 | A2 |

LOAD B1

Fig. 6I.

| | 200 | 199 | 198 | 197 | ••• | 3 | 2 | 1 |
|---|---|---|---|---|---|---|---|---|
| X | 1 | 1 | 1 | 1 | ••• | 1 | 1 | 1 |
| Y | 0 | 1 | 0 | 1 | ••• | 1 | 0 | 1 |
| D | B100 | A100 | B99 | A99 | ••• | A2 | B1 | A1 |

RECORD B LOADED

Fig. 6J.

| | 200 | 199 | 198 | 197 | ••• | 3 | 2 | 1 |
|---|---|---|---|---|---|---|---|---|
| X | 1 | 0 | 0 | 0 | ••• | 0 | 0 | 0 |
| Y | 1 | 0 | 0 | 1 | ••• | 1 | 0 | 1 |
| D | B1 | 0 | B100 | A100 | ••• | A3 | B2 | A2 |

WRITE AND RECIRCULATE THEN DOUBLE SHIFT

Fig. 6K.

| | 200 | 199 | 198 | 197 | ••• | 3 | 2 | 1 |
|---|---|---|---|---|---|---|---|---|
| X | 1 | 1 | 0 | 0 | ••• | 0 | 0 | 0 |
| Y | 0 | 1 | 0 | 0 | ••• | 0 | 1 | 0 |
| D | C1 | B1 | 0 | B100 | ••• | B3 | A3 | B2 |

LOAD C1

Fig. 6L.

| | 200 | 199 | 198 | 197 | ••• | 3 | 2 | 1 |
|---|---|---|---|---|---|---|---|---|
| X | 1 | 1 | 1 | 1 | ••• | 0 | 0 | 0 |
| Y | 1 | 0 | 1 | 0 | ••• | 1 | 0 | 1 |
| D | N-1 85 | N 85 | N-1 84 | N 84 | ••• | N-2 86 | N-1 86 | N-2 85 |

MEMORY NOT FULL

Fig. 8A.

| | 200 | 199 | 198 | 197 | ••• | 3 | 2 | 1 |
|---|---|---|---|---|---|---|---|---|
| X | 1 | 1 | 1 | 1 | ••• | 0 | 0 | 0 |
| Y | 0 | 1 | 0 | 1 | ••• | 0 | 1 | 0 |
| D | 0 | N-1 85 | N 85 | N-1 84 | ••• | N-1 87 | N-2 86 | N-1 86 |

PAD 0

Fig. 8B.

| | 200 | 199 | 198 | 197 | ••• | 3 | 2 | 1 |
|---|---|---|---|---|---|---|---|---|
| X | 1 | 1 | 1 | 1 | ••• | 0 | 0 | 0 |
| Y | 1 | 0 | 1 | 0 | ••• | 1 | 0 | 1 |
| D | N-1 86 | 0 | N-1 85 | N 85 | ••• | N-2 87 | N-1 87 | N-2 86 |

RECIRCULATE

Fig. 8C.

| | 200 | 199 | 198 | 197 | ••• | 3 | 2 | 1 |
|---|---|---|---|---|---|---|---|---|
| X | 1 | 1 | 1 | 1 | ••• | 1 | 1 | 1 |
| Y | 0 | 1 | 0 | 1 | ••• | 1 | 0 | 1 |
| D | 0 | N-1 100 | 0 | N-1 99 | ••• | N-1 2 | N 1 | N-1 1 |

MEMORY FULL HALF PADDED

Fig. 8D.

| | 200 | 199 | 198 | 197 | ••• | 3 | 2 | 1 |
|---|---|---|---|---|---|---|---|---|
| X | 1 | 0 | 0 | 0 | ••• | 0 | 0 | 0 |
| Y | 1 | 0 | 0 | 1 | ••• | 1 | 0 | 1 |
| D | N 1 | 0 | 0 | N-1 100 | ••• | N-1 3 | N 2 | N-1 2 |

AFTER WRITE RECIRCULATE AND DOUBLE SHIFT

Fig. 8E.

| | 200 | 199 | 198 | 197 | ••• | 3 | 2 | 1 |
|---|---|---|---|---|---|---|---|---|
| X | 1 | 1 | 0 | 0 | ••• | 0 | 0 | 0 |
| Y | 0 | 1 | 0 | 0 | ••• | 0 | 1 | 0 |
| D | 0 | N 1 | 0 | 0 | ••• | N 3 | N-1 3 | N 2 |

PAD 0

Fig. 8F.

| | 200 | 199 | 198 | 197 | ••• | 3 | 2 | 1 |
|---|---|---|---|---|---|---|---|---|
| X | 1 | 1 | 1 | 0 | ••• | 0 | 0 | 0 |
| Y | 1 | 0 | 1 | 0 | ••• | 1 | 0 | 1 |
| D | N 2 | 0 | N 1 | 0 | ••• | N-1 4 | N 3 | N-1 3 |

RECIRCULATE

Fig. 8G.

| | 200 | 199 | 198 | 197 | ••• | 3 | 2 | 1 |
|---|---|---|---|---|---|---|---|---|
| X | 1 | 1 | 1 | 1 | ••• | 1 | 1 | 1 |
| Y | 0 | 1 | 0 | 1 | ••• | 1 | 0 | 1 |
| D | 0 | 0 | 0 | 0 | ••• | N 2 | 0 | N 1 |

MEMORY FULL PADDED

Fig. 8H.

REDUNDANT OFFSET RECORDING

BACKGROUND

This invention relates to a method and apparatus for recording information in a manner that allows the information to be retrieved essentially without error due to a recording medium defect. More particularly, the invention provides a method and apparatus for recording information with minimal redundancy on an information-storage medium in a manner that allows the information to be retrieved essentially free of error or loss due to a defect of the medium, even where the defect is common to all the tracks on the medium.

The invention can be practiced with a recording medium capable of storing information in only two channels or tracks. This allows the invention to be used with a recording medium such as the narrow magnetic tape used in digital cassette recorders.

It is known in the prior art, as set forth for example in U.S. Pat. Nos. 2,628,346 and 2,813,259 of Wm. H. Burkhart, to record the same digital information in each of at least three tracks of a magnetic recording medium for recovery with low error content. These prior schemes compare the information read from all the tracks to produce the final output information. This requires that multiple-track read-out equipment be operable throughout the playback operation.

It is also known to record digital information in two side-by-side tracks with each unit of information being recorded four times: in two successive blocks in one track and again in two side-by-side blocks in the other track. Reading data recorded in this manner requires, in the optimum condition when no errors are detected, that alternate blocks be skipped, either physically or electronically, in order to produce a read-out of the information in which each item appears only once.

Accordingly, it is an object of this invention to provide an improved method and apparatus for recording information on a record medium for recovery without loss due to defects in the medium, even a defect that extends transversely across all the recording tracks of the medium.

Another object of the invention is to provide a method and apparatus of the above character which requies only that each item of information be recorded once in each of two tracks.

Another objects of the invention is to provide a method and apparatus of the above character which only require that the recording medium provide two recording tracks.

A further object is to provide a method and apparatus of the above character which at any time process information read from only one track in order to reproduce a recorded unit of information. Correspondingly, it is an object to provide such a method and apparatus that require that only one playback unit be operable at any one time for each item of information being recovered.

It is also an object of the invention to provide a method and apparatus of the above character that sense an error in the playback of a unit of information by examination of the information read from only a single track.

Other objects of the invention will in part be obvious and will in part appear hereinafter.

SUMMARY OF THE INVENTION

Magnetic recording equipment in accordance with the invention records each unit of information once in one set of recording tracks and once again in another set of tracks, with the information in one set of tracks being longitudinally offset from the information in the other set of tracks. Upon playback, the information is read in succession from either set of tracks and, unless an error is detected, delivered directly to the data processor or other data-utilizing equipment. However, when an error is detected in the information read from one set of tracks, the read-out equipment switches to the other set of tracks and re-reads the same unit of information as recorded in the latter set of tracks.

The information typically is recorded in each track in a succession of equal-length and spaced records. Further, successive records on the different tracks are aligned across the record medium with each other. With this arrangement, the physical offset of the information recorded in one set of tracks from the recordal of the same information in the other track set preferably is equal to the length of one record and one interrecord gap.

This recording format and the preferred logic by which the invention is practiced make it possible to restrict all switching from one set of tracks to the other to the gaps between adjacent records.

The invention accordingly comprises the several steps and the relation of one or more of such steps with respect to each of the others, and the apparatus embodying features of construction, combinations of elements and arrangement of parts adapted to effect such steps, all as exemplified in the following detailed disclosure, and the scope of the invention is indicated in the claims.

BRIEF DESCRIPTION OF FIGURES

For a fuller understanding of the nature and objects of the invention, reference should be made to the following detailed description taken in connection with the accompanying drawings, in which:

FIGS. 6 A through L shows in schematic form the contents of the buffer memory of the FIG. 3 equipment at successive stages along the flow chart of FIG. 5;

FIGS. 8 A through H shows the contents of the FIG. 3 buffer memory at successive stages along the flow chart of FIG. 7.

DESCRIPTION OF ILLUSTRATED EMBODIMENTS

Figure 1:
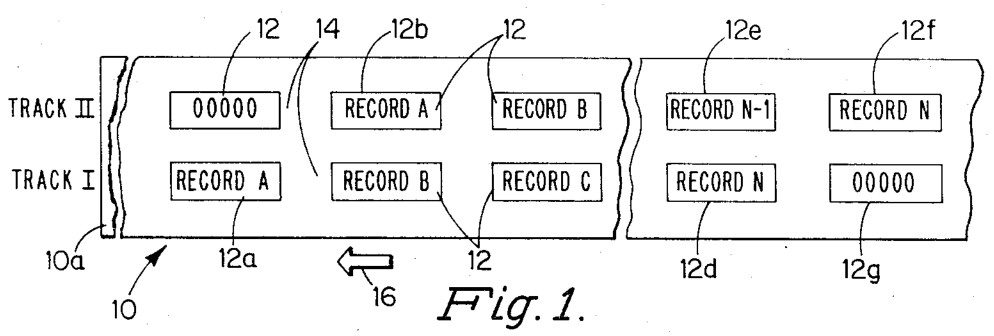
FIG. 1 is a pictorial representation of information recorded on a magnetic tape in accordance with the invention.

FIG. 1 shows a magnetic recording tape 10 having information recorded on it in accordance with the invention. For reading and for writing information with regard to the tape, it is moved relative to the recording or read-out head, whichever the case may be, along the tape length; arrow 16 indicates the direction of forward tape movement and the beginning end of the tape is the end 10*a*. The recorded information is arranged in two side-by-side tracks, designated track I and track II, extending along the tape length and the information in each track is arranged in successive blocks 12 separated from each other by inter-record gaps 14. Further, each block 12 is coextensive with a block in the other track; the two side-by-side blocks are designated herein as "associated" with each other.

In accordance with the invention, each unit of information is recorded once in each track, and the information in each track is offset along the tap length from the same information in the other track. Thus, as shown in FIG. 1, record A is recorded in track I in block 12*a*, and is again recorded in track II in the next successive block 12*b*. With this arrangement, recorded in successive blocks 12 of track I are records A, B, C, . . . N, and ZERO: while the associated blocks 12 of track II contain, in succession, ZERO, records A, B, . . . (N-1), and N.

The information recorded on tape 10 in this format can be read from either track, although it is preferred to read normally from track I, where each unit of information leads, i.e. is recorded ahead of, the recordal of the same information unit in track II.

Upon detection of an error in the information read from one track, e.g. track I, the same information is reread from the other track, which usually is free of whatever defect caused the read-out error in the former track. The read-out of successive items of information, e.g. successive records, can continue from the second track. However, it is considered preferable to reverse the tape for one block, and then resume reading successive records from the first leading, track.

Recording medium defects generally are either voids in the recording medium or contamination (dirt) on the medium. The read-out available with the invention is in all probability free of errors due to these defects because it is improbable that defects will be present in two successive blocks in different tracks. In fact, where the tape 10 has such a high occurrence of defects, it typically is considered that the tape is in need of reconditioning, i.e. cleaning, or replacement.

Each block 12 of the tape 10 in FIG. 1 can contain a single "row" of information recorded in serial fashion along the tape length, and correspondingly the two tracks of associated blocks represent two single-bit rows of serial information. Accordingly, the practice of the invention as illustrated in FIG. 1 makes it possible to record information on a narrow recording medium, as is used in a two-track magnetic tape cassette, with read-out essentially free of errors due to defects of the recording medium.

Figure 2:
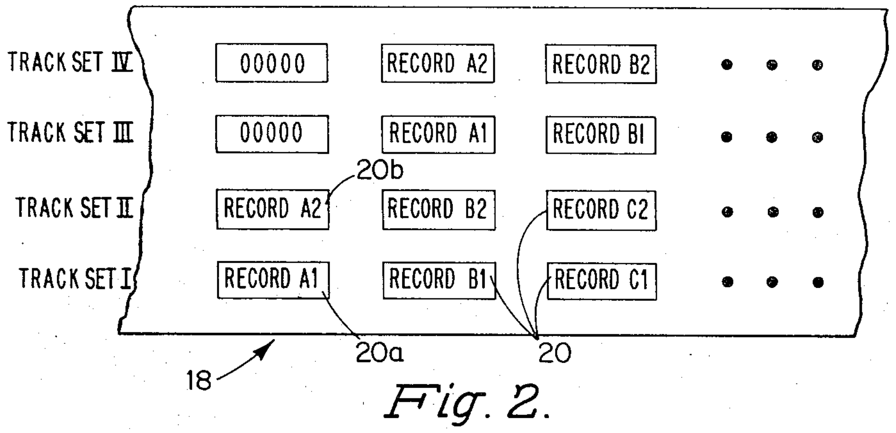
FIG. 2 is a similar pictorial representation of another magnetic recording tape having information recorded thereon in accordance with the invention.

The invention, however, is not limited to being practiced with the information recorded in serial fashion or in only two tracks. For example, FIG. 2 shows another magnetic tape 18 having information recorded thereon in accordance with the invention in four sets of tracks, with each set having one or more tracks. Two segments of each information item are recorded in parallel in associated blocks of two sets of tracks. That is, records A1 and A2 recorded in associated blocks 20*a* and 20*b* of track set I and track set II, respectively, constitute one item of information, and records B1 and B2 constitute a second item. These same records A1 and A2 are again recorded in track set III and track set IV, respectively, in the blocks next following blocks 20*a* and 20*b*.

The read-out of information from the tape 18 of FIG. 2 is similar to the read-out of information from tape 10 of FIG. 1. That is, the two sets of track I and II are read in parallel. In the event an error is detected in reading, for example, record A2 from block 20*b*, that record is again read from track set IV.

Figure 3:
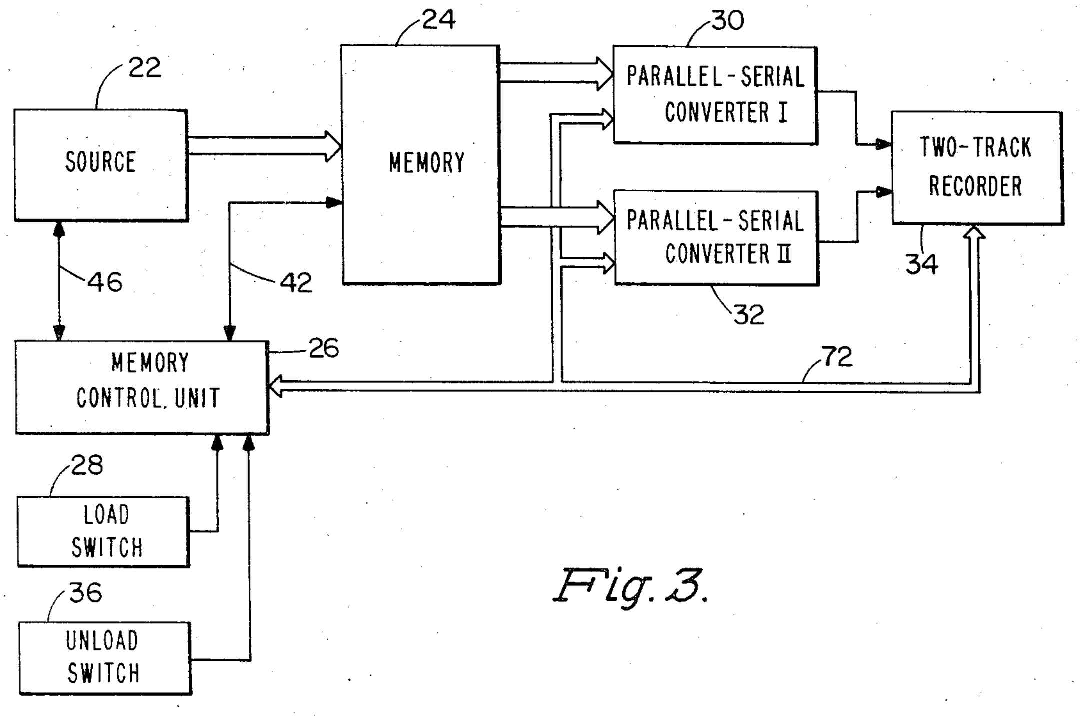
FIG. 3 is a block schematic representation of information recording equipment according to the invention.

FIG. 3 shows equipment in accordance with the invention for recording information on a two-track tape with a format as shown in FIG. 1. A source 22 delivers the information to be recorded to a memory 24 under control of a memory control unit 26 upon actuation of a load switch 28. Also under control of the unit 26, the memory 24 delivers the information to two parallel-to-serial converters 30 and 32, from which the information is serially fed to a two-track recorder 34. Prior to removing the recording medium from the recorder 34, an unload switch 36 is actuated to signal the memory control unit 26 to complete the recording of the information in the two tracks of the tape in accordance with the invention.

The source 22 can be a teletypewriter, computer, or other conventional source of information in binary digital format. The illustrated source delivers a character of information at a time and in parallel format to the memory 24, which is a static memory of conventional construction employing, for example, magnetic cores or flip-flop storage elements. In the embodiment of the invention described hereinafter with reference to FIGS. 5 through 9, the memory 24 is constructed with integrated circuit shift registers such as are available from Signetics Corporation under the designation "Signetics 2,500 Series Dual 50, 100 and 200 bit recirculating static shift registers." As described below, the memory 24 provides buffer-type storage of the information being recorded in one track interleaved with the information being recorded in the other track.

Each converter 30, 32 can employ a shift register that is loaded with information in parallel from the memory 24, and from which the information is fed in series to the recorder 34, which is also of conventional construction. The memory control unit 26 is constructed with conventional digital logic design techniques; a specific embodiment of a control unit in accordance with the invention provides the sequence of operations described hereinafter with reference to FIGS. 5, 6, 7 and 8. The specific detailed construction of the control unit and of the other elements of the system of FIG. 3 employ conventional known practices for implementing the logical operational sequences shown in and described with reference to FIGS. 5 through 8.

In brief, in the illustrated operating sequence discussed below with reference to FIGS. 5 and 6, at successive times, the memory receives from the source successively occurring characters of a single record and stores them in a first set of alternate locations. The memory also stores the characters of the preceding record received from the source in the other, second set of alternate locations. When the memory is full, i.e. stores two successive records of information, the control unit operates the memory and associated recording equipment to write the characters of the newly received record in a first set of one or more tracks of the recording medium, and, to write the other, previously received, record in a second set of one or more tracks parallel to the first set of tracks. The selection of in which set of tracks a character is recorded is made in accordance with whether the character was stored in the memory in the first set of locations or in the second set of locations.

During the write operation, the newly received record is saved in the memory. After the write operation, as the memory receives the characters of the next record, it stores them in the first set of alternate locations interleaved with the storage in the second set of locations of the characters that were received in the preceding operating cycle. Thus, the characters of a record first are stored in one set of alternate memory locations and then in the other set of alternate memory locations. Consequently, the characters of each record are recorded first in the first set of recording medium tracks, and next recorded again in the other, second set of recording tracks.

In this manner, successively occurring records of information are recorded once in each of two sets of one or more recording medium tracks. Further, in each track, the records are recorded in the succession in which they occur and the two recordings are offset from each other by a distance equal to at least the segment of recording medium that contains one record, plus one inter-record space, or gap.

As indicated above, information is read from the record medium from only one set of tracks, preferably the first set. However, when an error is detected in the information read from this set of tracks, during the passage of the next inter-record gap by the read transducer, the read-out switches automatically to the other set of tracks and rereads the record in which the error was detected. The equipment then resumes reading of successive records, preferably again from the first set of tracks.

More particularly, upon detection of an error, the read-out equipment continues to advance the record medium until the passage by the read-out transducer of the end of the block containing the error; for control purposes the read-out memory is loaded with zeros during this time. Thereafter, the equipment switches to the other set of tracks and rereads the same record of information, loading it into the read-out memory in lieu of the information loaded in during the read-out of the error-containing record.

Because the two sets of tracks store each record of information in longitudinally offset locations along the record medium, there is a high probability that the recording medium defect that caused the error detected when reading from the first set of tracks, will not coincide with another defect that will cause an error when rereading the same information from the second set of tracks. In particular, a scratch, crease or like defect that typically extends across all the tracks of a record medium, such as a narrow magnetic tape, is very unlikely to traverse records which are in different sets of tracks and laterally offset from each other by one record length plus one inter-record gap.

FIG. 6 shows the memory 24 as providing storage spaces organized into a rectangular array with two hundred memory positions represented by vertical columns numbered 1 through 200, and at least three horizontal rows in each position. The first row, designated X and illustrated as requiring one bit space in each position, provides storage for control information used to identify when the memory is full or empty. The second row, designated Y and illustrated as requiring one bit space in each position, provides storage for another control bit used to determine to which set of tracks of the record medium the data stored in that position is to be written. The third row of memory spaces, designated D for data, is in practice a set of several, e.g. eight, rows and stores the binary digits that define a single character of information. This illustrated memory is for operation with records of information containing one hundred characters.

Figure 5A:
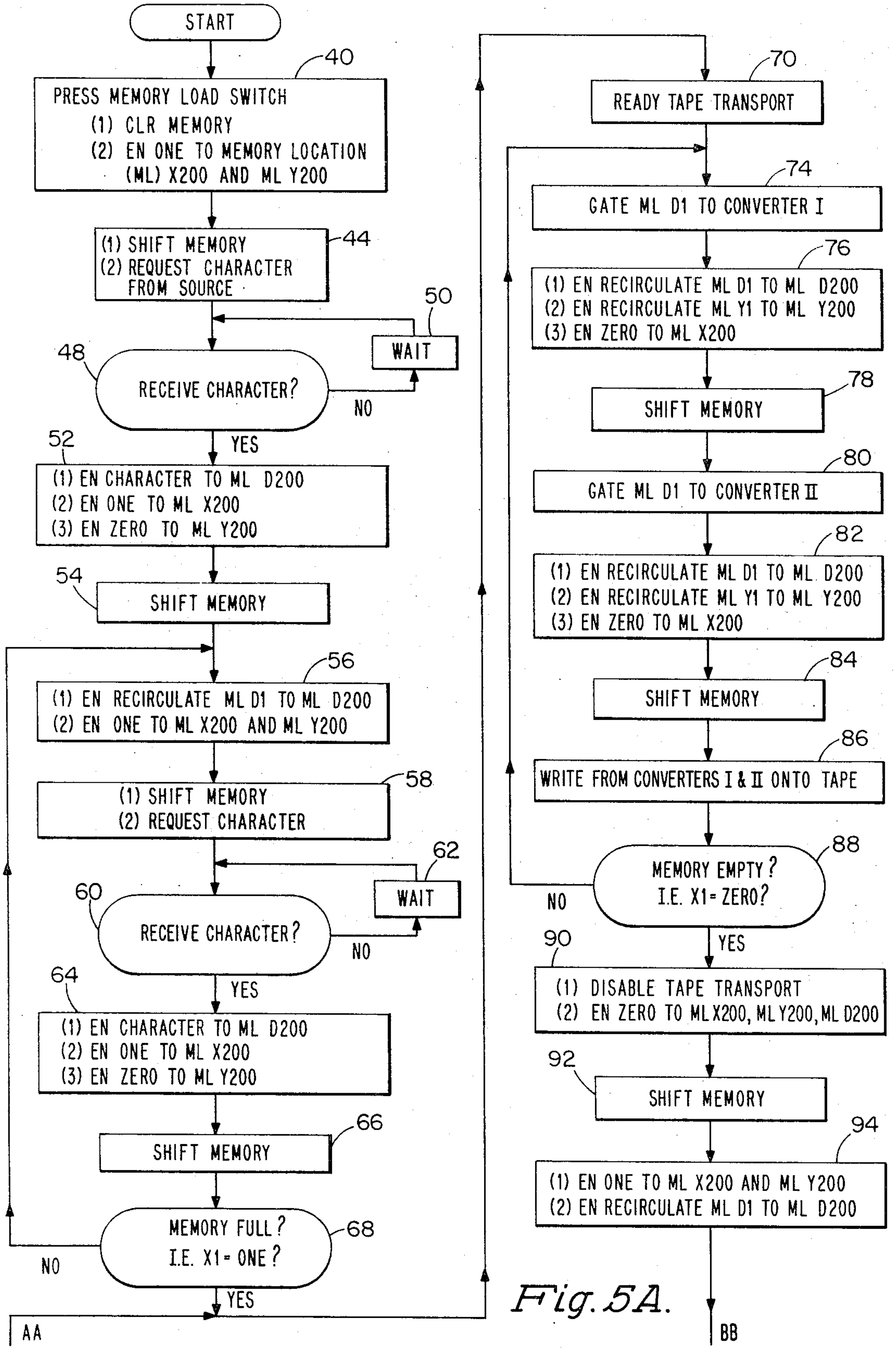
FIGS. 5 A and B is a flow chart of the sequence of operations which the equipment of FIG. 3 performs in recording information in accordance with the invention.
Figure 5B:
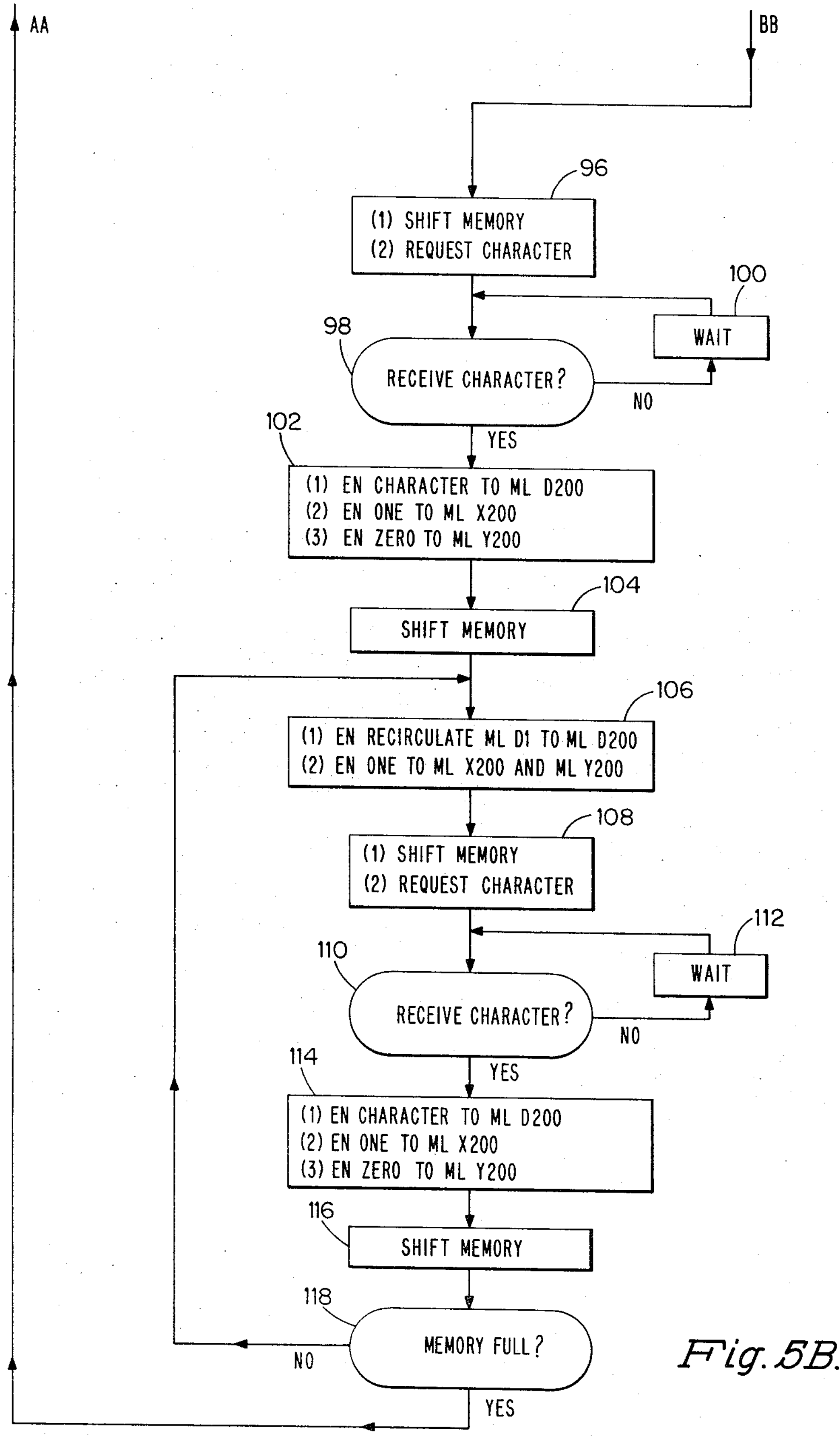

Considering FIG. 5 in detail, the sequence of operations for loading characters of information into the FIG. 3 memory 24 from the source 22 commences when the operator presses the memory load switch 28 (FIG. 3). As shown in action box 40, in response to closure of this switch, the memory control unit 26 clears the memory 24 and enables a ONE to be loaded into memory locations (ML) X200 and Y200. (The control unit sends the control signals for effecting these and subsequent memory operations to the memory, and receives control signals from the memory, by way of a set of control lines 42, FIG. 3.)

In the next time interval, as indicated in action box 44, the control unit shifts the memory 24 one position to the right. This operation shifts the contents of each memory position to the next lower-numbered memory position and normally loads a ZERO into the leftmost, number 200, memory position except when the memory is enabled for loading in other information. Thus, this shift memory operation indicated in action box 44 stores ZEROS in the memory location D200 and, by virtue of the enabled conditions set up as indicated in action box 40, loads a ONE into memory locat6ons X200 and Y200. FIG. 6A indicates the contents of the memory 24 after this shift operation, and as indicated, the memory stores ZEROS in every memory location except for the ONES just loaded into memory locations X200 and Y200.

As further indicated in action box 44, at the time the control unit 26 shifts the memory 24 one position to the right, it requests a character from the source 22 by way of control lines 46. The operation proceeds to decision box 48 where, as indicated, the control unit waits (action box 50), until the memory 24 receives a character from the source, at which point the operation advances to action box 52. As indicated there, the control unit 26 enables the memory locations D200 to load in the character, enables a ONE to be loaded into memory location X200, and enables a ZERO to be loaded into memory location Y200. The control unit then shifts the memory, action box 54, which causes the memory to shift one position to the right, and to load a ONE into location X200, a ZERO into location Y200, and the first character (which is the first character of record A and hence is designated character A1) into locations D200. FIG. 6B shows the resultant contents of the memory.

The memory control unit 26 next executes the operations indicated in action box 56. These are to enable a recirculation of the contents in memory locations, D1 to memory locations D200, and to enable a ONE to be stored in each of locations X200 and Y200. Operation proceeds to action box 58, at which time the control unit shifts the memory (each "shift memory" operation indicated in the flow chart shifts the memory one position to the right). As indicated in FIG. 6C, the recirculate operation performed per action boxes 56 and 58 stores a ONE in each of memory locations X200 and Y200 and stores the data bits previously in locations D1 into locations D200.

Also during this memory recirculate operation, the control unit requests a further character from the source 22 (action box 58). As indicated with decision box 60 and action box 62, if no character is received, the operation waits until the character is received, at which time per action box 64 the control unit enables the memory to load this character into locations D200, to load a ONE into location X200 and to load a ZERO into location Y200. In response to the next shift memory operation (action box 66), the memory loads the specified information into position 200.

The operating sequence then advances to decision box 68. If the memory is not full, as indicated by the X1 digit being a ZERO, i.e. not a ONE, the sequence loops back to action box 56. The operations indicated in this action box and in the next action box 58 cause the memory to shift the memory while recirculating the character that was in locations D1 to locations D200 and to load a ONE into locations X200 and Y200.

At this juncture, the contents of the memory are as indicated in FIG. 6D. Data location 199 contains the second character of the first block, designated as character A2.

It should now be noted that with the illustrated control unit 26, a ONE is loaded into the memory location X in each position where a character newly received from the source is stored, and in each memory position storing a character recirculated from locations D1 to D200. However, each Y location contains a ZERO in the memory position that stores a character newly received from the source, whereas each Y location stores a ONE in the memory position that stores a recirculated character.

The operating sequence continues with the request-character operation in action box 58 and the operations indicated in boxes 60, 62, 64, 66 and 68; alternately to load successively occurring characters newly received from the source and to recirculate the contents of locations D1 into locations D200, until the memory is full, as indicated by a "yes" output from decision box 68. At this juncture, as shown in FIG. 6E, the evenly numbered data locations of the memory contain the one hundred characters of record A.

The operation proceeds to action box 70, where the control unit readies the tape transport, e.g. signals it by way of control line 72 to be ready to write information. This involves conventional operations, among which typically is to begin advancing the magnetic tape or other like recording medium.

As further indicated in the flow chart of FIG. 5, the operating sequence next proceeds to a series of operations that write onto the recording medium the information stored in the memory data locations, and recirculates this information character by character from the memory locations D1 to locations D200. In particular, the first operation in this write and recirculate sequence, action box 74, is to gate the contents of memory locations D1 to converter I, indicated in FIG. 3 as converter 30. It is the binary digit one in the Y1 location, shown in FIG. 6E, that causes the memory contents in locations D1 to be gated to converter I, rather than converter II. As will appear below, a ZERO in the Y1 location causes the contents of the memory locations D1 to be gated to converter II.

After this transfer of a character to one of the converters 30, 32 in parallel, the sequence advances to action box 76 and the memory is enabled to recirculate the same character from locations D1 to locations D200, to recirculate the control bit in location Y1 to location Y200, and to enable a ZERO into location X200. The memory control unit 26 then shifts the memory one position to the right, which loads position 200 as per the enabled conditions. Next, per action box 80, the control unit gates the next character in locations D1 to the converters, this transfer being to converter II by virtue of location Y1 containing a binary ZERO. This operation is followed by action boxes 82 and 84, which repeat the recirculate operations of action boxes 76 and 78.

At this juncture, two characters—one from each of two records—have been transferred from memory 24 to the parallel to serial converters 30 and 32. The converter I contains the character A1 and, because the illustrated sequence at this point is writing the first record on the beginning end of the tape, the character in converter II is all ZEROS.

The next operation is to write the two characters in the converters onto the tape, action box 86. The mechanism of the write operations are conventional, with each converter shifting the character bits therein to the recorder 34 in serial fashion for recording in a track of the record medium. With reference to FIG. 1, converter I writes characters in track I and converter II writes characters in track II. In the preferred embodiment illustrated, the information is recorded in each track according to the conventional self-clocking phase encoded technique. This manner of recording provides timing pulses from the recorded information for use in a preferred form of read-out from the recording medium as is discussed below with reference to FIG. 9.

Each converter 30, 32 can include a counter that counts the digits being fed serially to the recorder, for signalling when all the digits of a character have been recorded.

Upon completion of the character-writing operation performed per action box 86, the memory control unit 26 next senses (decision box 88) whether the memory 24 is empty, as would be indicated by a ZERO bit in location X1. When the memory is not empty, the sequence repeats the operations of action boxes 74 through 86 to write another pair of characters, one from each of two records, from the memory 24 on to the recording medium. This operation continues until the memory 24 is empty, as determined with an affirmative output from decision box 88. At this juncture, a complete record has been written onto one block in each of the two sets of tracks of the recording medium, for example, record A is written in block 12a of FIG. 1 tape 10 and ZEROS are written in the associated block of track II. FIG. 6F shows that contents of the memory at this juncture are identical to the contents of the loaded memory as shown in FIG. 6E, with the significant exception that all X locations now contain a ZERO.

The memory control unit 26 next, in accordance with action box 90, disables the tape transport or recorder 34 of FIG. 1, and enables the loading of a ZERO into each of memory locations X200, Y200 and D200. This is followed by a shift memory operation, action box 92. FIG. 6G shows the contents of the memory after this first shift operation performed per action boxes 90 and 92. The memory control unit 26 executes a second shift operation with the steps indicated in action boxes 94 and 96. With the enable conditions set up per action box 94, the shift memory operation of action box 96 loads a ONE into each of memory locations X1 and Y1 and recirculates the character previously in locations D1 to locations D200; FIG. 6H illustrates the resultant contents of the memory.

While the control unit is shifting the memory per action box 96, it also signals the source 46 with another request character signal, and after awaiting the arrival of the requested character per decision box 98 and action box 100, proceeds to load the newly received character into the memory, with the appropriate X and Y bits, in accordance with action boxes 102 and 104. FIG. 6I shows the status of the memory at this point, with the newly received character indicated as B1, i.e. the first character of record B.

The control unit next recirculates the character A2 to locations D200 be enabling the recirculation of the contents of locations D1 to locations D200, and by enabling a ONE to be loaded into each of locations X200 and Y200, action box 106. This is followed by a shift memory operation, action box 108.

It should be noted, as shown by examination of FIGS. 6G, 6H and 6I, that in loading the characters of the newly received record B into memory 24 and recirculating the characters of the immediately preceding record A, the characters of the next preceding record, which at this point are all ZEROS, are discarded.

Upon receiving the character B2 requested in action box 108, the memory control unit proceeds to action boxes 114 and 116 to load that character into the memory locations 200, to load a ONE into location X to indicate that the position contains a character, and to load a ZERO into location Y200 to indicate that the position contains a newly received character. If the memory 24 is not full at this point, as indicated with a no output from decision box 118, the operation loops back and repeats the operations of action boxes 106, 108, 110, 112, 114, 116, 118 until the memory is full. FIG. 6J shows the contents of the memory at this point, where all the characters of record B are loaded into the memory.

At this point, the output from decision box 118 is affirmative and, as indicated in FIG. 5, the operation loops back to action box 70 to perform another character writing and memory recirculation operation, action boxes 70 through 88.

After this write and recirculate operation, and the two shift operations performed as indicated in action boxes 90, 92, 94 and 96, the contents of the memory are as indicated in FIG. 6K. The next character that is received from the source 22, is the character C1, and after it is loaded into the memory, the memory contents appear as indicated in FIG. 6L.

The write and recirculate operation performed after record B was loaded into the memory, i.e. when the memory was in the condition shown in FIG. 6K, writes recrod A in block 126, track II and record B in the associated block, track I, as shown in FIG. 1. Examination of the recording of record A in each of the two tracks I and II as shown in FIG. 1 indicates that the desired redundant recording has indeed been achieved.

The memory loading and recirculating operation and the writing operations thus set forth in the flow chart of FIG. 5 continue on a repetitive basis until no further characters are received from the source 22, or until the tape of other record medium is full, or until the operator manually haults the operation, all of which are known operations that can be implemented with conventional practices.

When the tape 10 of FIG. 1 or another record medium storing information in accordance with the invention is to be unloaded, i.e. removed from the transport, the last blocks recorded onthe tape should have the format shown at the right side of FIG. 1. Here, track I stores character N in block **12*d* and the associated block 12*e* in track II stores the previously occuring character (N-1). The next successive block 12*f* in track II stores the character N and the associated track I block 12*g*** stores ZEROS.

To provide this format of the recorded data at the end of the tape 10, the memory control unit 26 of FIG. 3 has further binary digital logic that will now be described with reference to the unload tape flow chart of FIG. 7, and to FIG. 8 which shows the contents of the FIG. 3 memory 24 at different times in this sequence.

Figure 7:
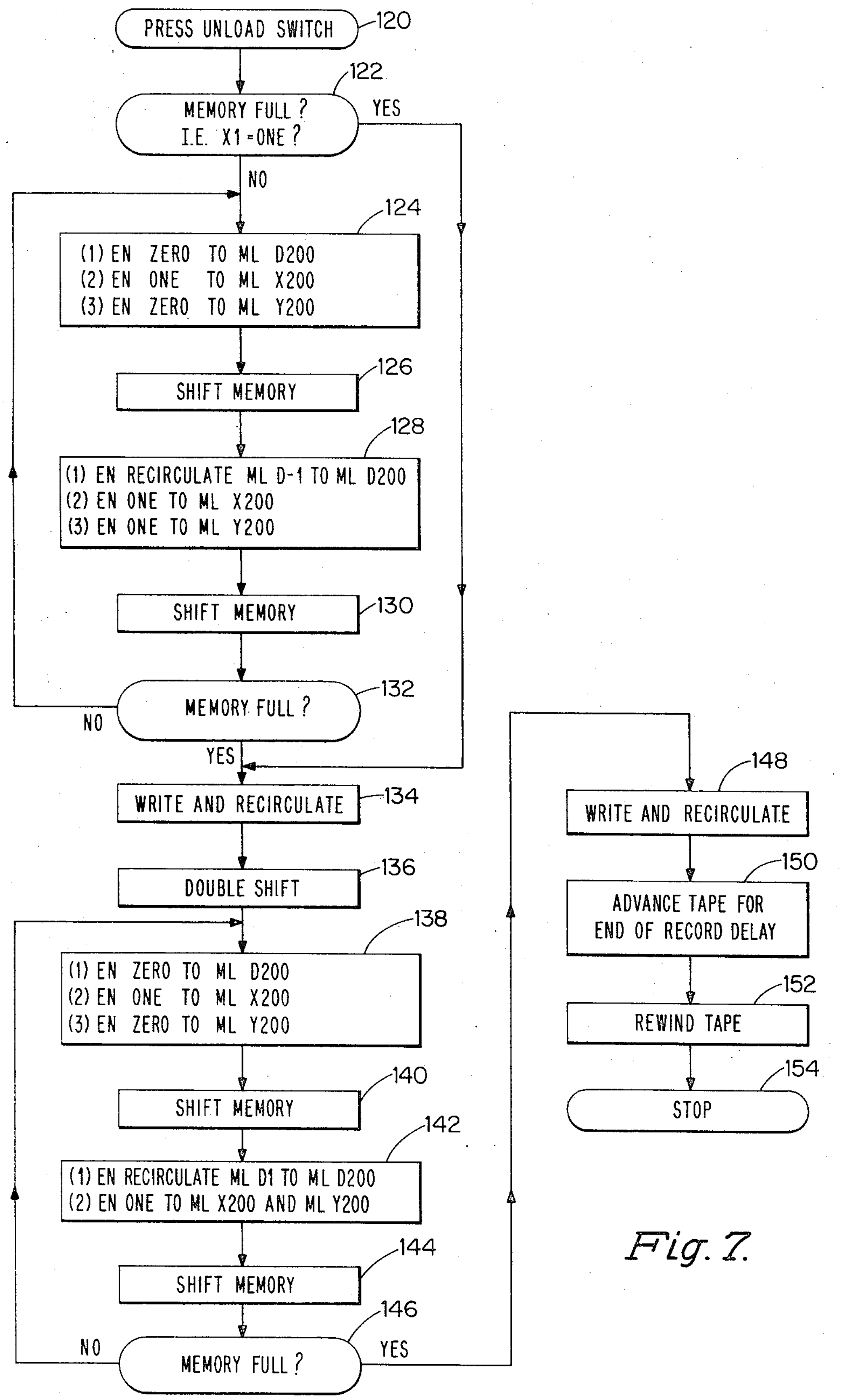
FIG. 7 is a flow chart of the sequence of operations which the FIG. 3 equipment performs in recording the final blocks of information on a record.

The operator depresses the FIG. 3 unload switch 36 prior to removing the tape from the transport, and this operation initiates the unload tape sequence as indicated in FIG. 7 with action block 120. The closure of switch 36 actuates the memory control unit to determine whether the memory 24 is full (decision box 122), is indicated by the contents of the X1 location. When the memory is not full, but rather has contents such as are indicated in FIG. 8A, the memory control unit 24 advances to a series of memory padding and recirculating operations commencing with action box 124.

The status of memory 24 assumed as an example and shown in FIG. 8A follows the writing of record (N-2) and the next successively occurring record (N-1) in the blocks immediately preceding the blocks **12*d* and 12*e* shown in FIG. 1. Further, the memory was in the process of loading in the characters of the final record N when the load operation was interrupted. Specifically, the illustrated memory condition shown in FIG. 8A is that the 85th character N85 from the source has been loaded into the memory, and character (N-1) 85 has been recirculated from locations D1 to locations D200. Thus, FIG. 8A shows the status of the memory 24 at a time when the memory control unit 26 requested a character from the source, as with the action indicated in FIG. 5 at action box 96 and the decision from decision box 98 was negative, so that the operation advanced to the wait condition of action box 100** (FIG. 5) and proceeded no further.

From that juncture, and upon determination with FIG. 7 decision box 122 that the memory was not full, the memory control unit proceeds to action box 124 to commence completing the storage of a full record of characters in the memory. This is done by enabling ZEROS to locations D200, ONE to location X200, and ZERO to location Y200. A subsequent shift memory operation, action box 126, loads the memory in accordance with these enable conditions and the resultant memory status is shown in FIG. 8B. This operation just completed is referred to as a pad ZERO operation. It will be seen from FIG. 8B that instead of receiving the character N86, the memory is padded with ZEROS and in the D200 locations, the X200 location contains a ONE to indicate that the D200 locations are of that to be considered full, and the Y200 location contains a ZERO to indicate that the D200 locations are to be treated as containing a newly received character.

Next, as shown in FIG. 7 with action box 128, the memory control unit 26 enables the memory 24 to recirculate the contents of locations D1 to locations D200, and to load ONES into each memory locations X200 and Y200. A subsequent shift memory operation, action box 130, places the memory in the condition shown in FIG. 8C.

If the memory is still not full, as indicated with a no output from decision box 132, the memory control unit 26 again executes the pad ZERO and recirculate operations executed in accordance with action boxes 124 and 126, and action boxes 128 and 130. These operations continue until the memory is full, at which point the contents of the memory are as indicated in FIG. 8D. At this juncture, the result of the memory full determination per decision box 132 is affirmative, and the memory control unit 26 proceeds to perform a write and recirculate operation, action box 134. This operation is performed in the identical manner shown in FIG. 5 commencing with action box 70 and proceeding through action boxes 74, 76, 78, 80, 82, 84 and 86 and decision box 88. Operation per action box 134 of FIG. 7 terminates when the result of FIG. 5 decision box 88 is affirmative. The condition of the memory after the write and recirculate operation of action box 134 is identical to that shown in FIG. 8D except that all the X locations contain a ZERO. Further, as shown in FIG. 1, the write operation records record N in block 12*d*, track I and record (N-1) in block 12*e*, track II.

The double shift operation performed next per action box 136 is a repeat of operations performed in the flow chart of FIG. 5. In particular, the double shift operation of FIG. 7, action box 136, is a repeat of the enable ZERO to memory locations X200, Y200 and D200 indicated in FIG. 5, action box 90, followed by a shift memory operation per FIG. 5, action box 92. That completes the first of the double shifts. The second of the double shifts involves the enable ONE to locations X200 and Y200 and enable recirculate from locations D1 to locations D200 per FIG. 5, action box 94, followed by the shift memory operation of FIG. 5, action box 96.

FIG. 8E shows the contents of the FIG. 3 memory 24 at this juncture, i.e. upon completion of FIG. 7, action box 136. Memory position 197 contains the last character of the (N-1) record, and the data locations 198 contain the ZEROS padded into the memory in place of the one-hundredth character of record N. Position 199 contains all ZEROS as stored with the first of the double shifts; and per the second shift, locations D200 store the recirculated N1 character and locations X200 and Y200 store ONES.

Subsequent to the double shift operation of action box 136, FIG. 7, the memory control unit 26 enables ZEROS to locations D200, a ONE to location X200 and a ZERO to location Y200, per action box 138. These are the same operations performed above per action box 124, and in like fashion the control unit next executes a shift memory operation, action box 140, to again pad a ZERO into the memory in lieu of a new character; FIG. 8F shows the resultant memory contents. The control unit next recirculates the memory with the operations indicated in action boxes 142 and 144 which are a repeat of action boxes 128 and 130. As indicated in FIG. 8G showing the status of the memory after the shift memory operation of box 144, the second character of the last block, i.e., character N2, is now in the memory data locations 200.

If the memory is not full at this juncture, as determined with decision box 146, the memory control unit 26 loops back and repeats the pad ZERO and recirculate operations of action boxes 138, 140, 142 and 144 until the memory is full, as indicated with a yes output from decision box 146.

At this juncture, the memory contents are as indicated in FIG. 8H. The set of alternate, odd-numbered, memory positions that normally store previously received characters now contain the characters of the Nth record. These are the 85 characters of record N and the ZEROS padded into the remaining positions of that set. The other set of alternate memory positions is padded entirely with ZEROS.

The control unit next executes the write and recirculate operations, action box 148, in the manner discussed above. This write and recirculate operation, records on the tape the information as shown in FIG. 1 in blocks 12*f* and 12*g*. That is, it repeats the recording of record N, previously recorded in track I, in track II, and records ZEROS in the associated block 12*g* of track I.

The remaining, final operations in the unload tape sequence are conventional and can be selected as desired. By way of illustration, FIG. 7 shows that after executing the write and recirculate operation of action box 148 (of which the recirculate steps are not required since there is no further need to save the information in the memory), the memory control unit 26 advances the tape as appropriate for the end of record delay, action box 150, and then reverses the tape to rewind it, action box 152, prior to stopping the operation, action box 154.

Figure 4:
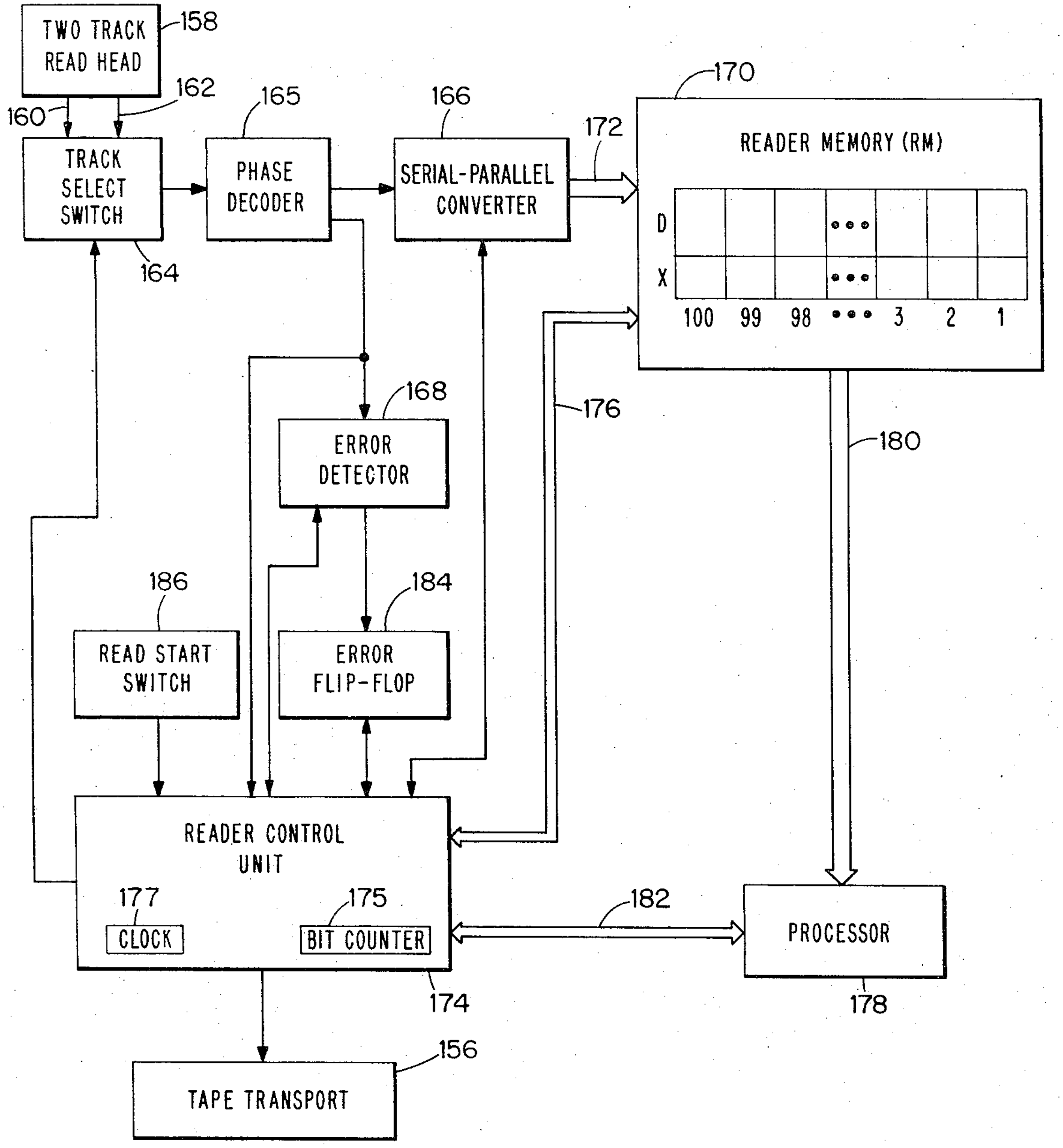
FIG. 4 is a block schematic representation of record reading equipment according to the invention.

Turning to FIG. 4, the read-out equipment in accordance with the invention for reading a magnetic tape having information recorded in two tracks as shown in FIG. 1 has a tape transport 156 fitted with a two-track read head 158, both typically part of the two-track recorder 34 of FIG. 3. Conductors 160 and 162 feed the signals read from the tape tracks I and II, respectively, to a track selected switch 164 that feeds the signals read from one track to a phase decoder 165.

In response to the read signals it receives, the decoder applies data signals identifying the recorded digits to a serial-to-parallel converter, and applies clock pulses to an error detector 168 and to a reader control unit 174. The decoder 165 normally produces a clock pulse for each digit-identifying data signal it applies to the converter 166. In response to the clock pulses, the control unit operates the converter serially to shift the digits which the data signals identify into a shift register therein. The control unit increments a bit counter 175 therein as each digit is loaded into the converter and the counter signals when a full character is assembled in the converter. In response, the control unit operates the converter 166 and, by way of control signal lines 176, a reader memory 170 to transfer the character in parallel to the memory via a character bus 172.

The control unit also applies control signals to operate the track select switch 164, and applies signals to the tape transport 156 for selectively operating the transport to move the tape in the forward direction, in the reverse direction, and to stop the transport.

FIG. 4 also shows an information processor 178, such as a computer, to which the read-out equipment delivers information read from the tape, by way of a bus 180. Further control signal lines 182 transfer control signals between the processor and the reader control unit 174.

The error detector 168 switches an error register, indicated as an error flip-flop 184, upon detection of an error in the clock pulses output from the decoder 165. The error flip-flop 184 is in turn connected to the reader control unit both for signalling the flip-flop state to the control unit and for being switched in response to signals from the control unit. A further signal input to the reader control unit is from a read start switch 186 which the operator actuates to start the read-out operation.

More particularly, the read-out equipment illustrated in FIG. 4 is for reading information recorded on a magnetic tape or like medium in accordance with the known phase-encoded technique. The phase detector 165 accordingly delivers the clock pulses which it produces in response to the read-out signals from the head 158 to the error detector 168. This latter unit, in turn, produces an error signal in response to either of two error conditions. One error condition is the absence of a clock pulse from the phase decoder 165 during the reading of a block of information. The illustrated error detector reports this error when it detects the absence of a clock pulse at a time when the reader memory 170 is empty, i.e. not full, as signalled to the error detector by the reader control unit 174.

The other error condition is the occurrence of extra clock pulses, i.e. clock pulses at a time when the inter-record gap (which is free of information and hence clock signals) is supposed to be passing by the read head. In the illustrated read-out equipment, the error detector 168 reports this second error when it detects the presence of a clock pulse at a time when the reader memory is full, as also signalled to the error detector by the reader control unit 174. A reader control unit for such operation can be constructed with known conventional skills. Error detectors of this kind also are available on the market; one error detector for this operation is available from Kybe Corporation, Waltham, Massachusetts.

With further reference to FIG. 4, the illustrated reader memory 170 is organized with one hundred memory positions, indicated as columns labelled 1 through 100. Each position has an X location, illustratively of one bit capacity, and data locations of the same capacity as the data locations of the FIG. 3 memory 24.

Figure 9A:
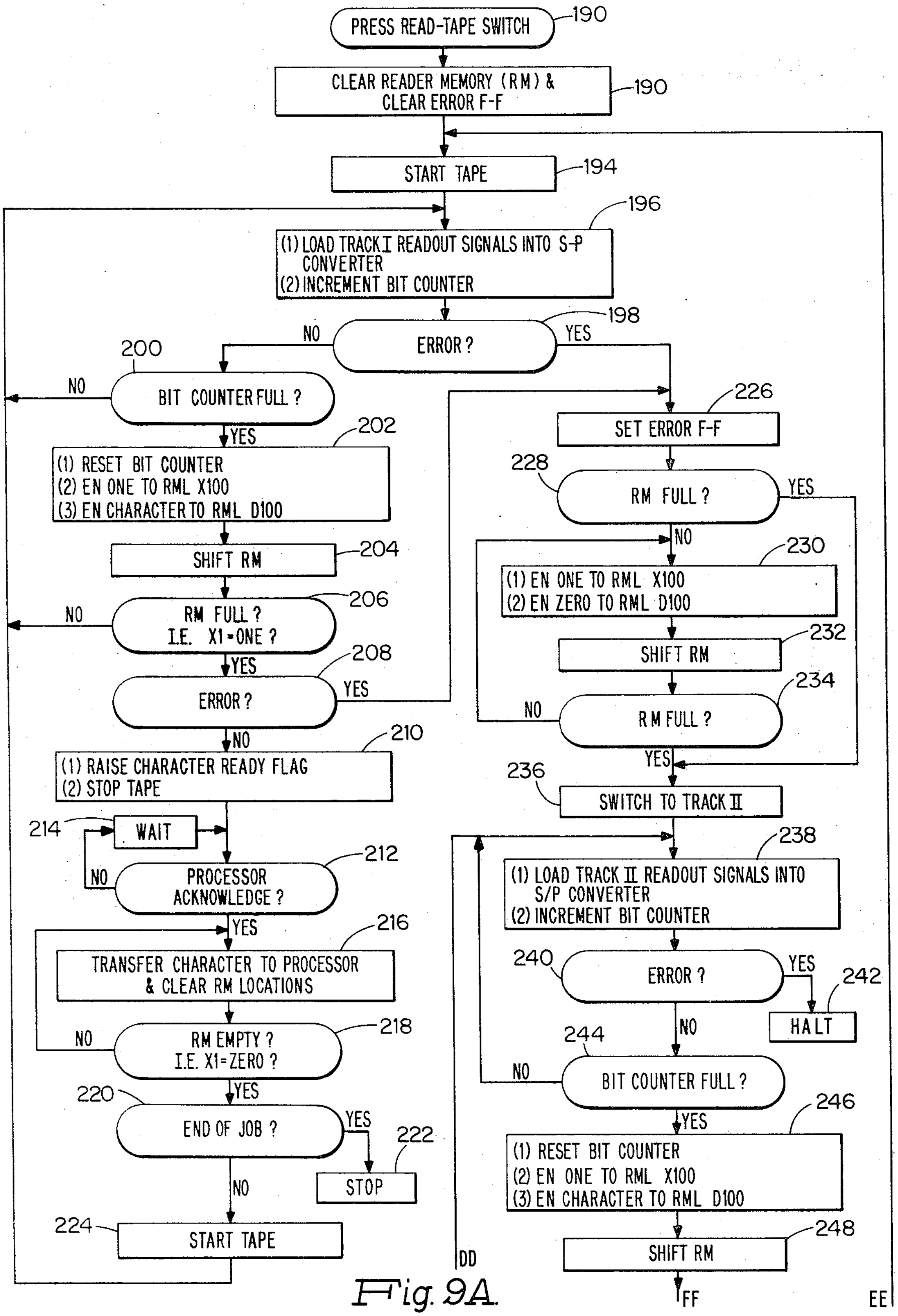
FIGS. 9 A and B is a flow chart of the sequence of operations which the equipment of FIG. 4 performs in reading information recorded in accordance with the invention.
Figure 9B:
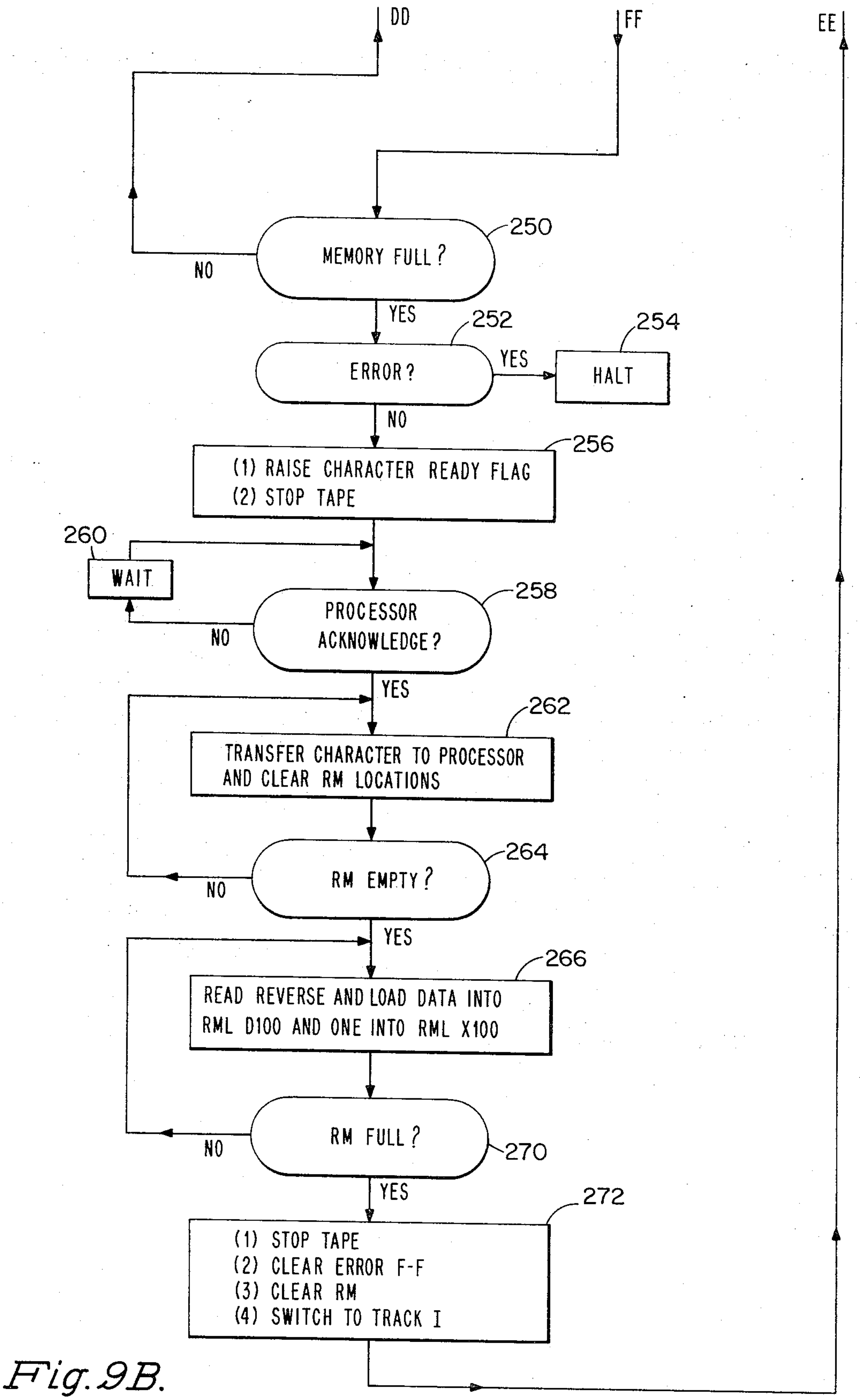

The reader control unit 174 is constructed in accordance with conventional logic design to provide the operating sequence set forth in the flow chart of FIG. 9, which is now described with further reference to FIG. 4.

The operation of the FIG. 4 read-out equipment commences when the operator presses the read start switch 186 as indicated in FIG. 9 with action box 190. In response to the closure of this switch, the reader control unit 174 clears all the positions of the reader memory and clears the error flip-flop 184, as indicated with action box 192.

The control unit next starts the tap transport 156 advancing the tape in the forward direction, action box 194. In response to the clock pulses which the control unit receives from the phase decoder 165, the control unit operates the serial-to-parallel converter 166 to load the read-out signals read from track I of the tape (FIG. 1) into the converter 166 and increments the bit counter 175 as each digit of a character is shifted into the converter, all as indicated in the next action box 196.

The track select switch is assumed initially to be switched to feed signals read from the reading head aligned over track I of the FIG. 1 tape 10 to the phase decoder 165. This initial condition can be realized either by constructing the switch to be normally in that position, or by setting the switch in that position at the time that the control unit provides the operations indicated in action box 192.

At this time, the reader memory is not full, and accordingly if the error detector 168 senses the absence of a clock pulse within the prescribed clocking time, the detector signals the control unit 174 of the error condition as indicated in FIG. 9 with decision box 198. When no error is detected, the operating sequence proceeds to decision box 200, at which point the reader control unit 174 determines whether the bit counter 175 is full. This counter is full only when the number of digits constituting a complete character have been shifted into the converter 166. When the bit counter is not full, the reader control unit 174 repeats the operations indicated in action box 196 repetitively until either an error occurs, as determined in accordance with decision box 198, or the bit counter is full, as determined in accordance with decision box 200.

Thus, the read-out equipment of FIG. 4 continues reading information from track I of the tape and shifting successive digits of a character into the converter 166 until a character is assembled in the converter, at which point the bit counter 175 is full and the output signal from decision box 200 is affirmative. This condition causes the reader control unit to proceed to action box 202, and reset the bit counter 175 and prepare to transfer the assembled character to the reader memory 170. This is done as shown in action box 202 by enabling the memory 170 to load a ONE into location X100 and to load the character from the converter into memory locations D100. The subsequent shift reader memory operation, action box 204, effects the transfer of the character in parallel from the converter 166 to the data portion of memory position 100 and places a ONE in the location X100 to indicate that the position contains a character.

The reader control unit 174 then advances to decision box 206 and determines whether the reader memory is now full. If the reader memory is not full, the control unit loads the bits of another character into the converter 166 from the read head 158 by returning the operation to action box 196, as indicated in FIG. 9. This sequence of loading characters into the converter in response to the read signals from the read head 158 and simultaneously incrementing the bit counter, and checking for missing clock pulses in accordance with decision box 198, and then transferring the character of bits assembled in the converter to the read memory 170 in accordance with action boxes 202 and 204, continues until the reader memory is loaded with a block of one hundred characters. After loading the one-hundredth character into the reader memory 170, location X1 will, for the first time, contain a ONE, and the output signal from decision box 206 will change from no to yes.

When the reader memory is full, the reader control unit 174 again ascertains whether an error condition is present, as indicated with decision box 208. However, the error being tested for at this time is whether the phase decoder 165 is still producing timing pulses. In the event there is no error, the control unit 174 raises a character ready flag, i.e. signals the processor 178 that a record is in the reader memory available for transfer to the processor 180, per action box 210. The control unit also signals the tape transport 156 to stop the movement of the tape. The read-out equipment operation then proceeds to decision box 212 and, in the event the processor does not acknowledge the ready flag, to the wait action of box 214 until such time as the processor acknowledges the flag signal. At this point the operation proceeds to action box 216 and the characters stored in the reader memory 170 are transferred to the processor 178, by way of bus 180, one at a time in a conventional manner. In the illustrated sequence, the characters are transferred to the processor starting with the character in position 100 and are taken in order with the character in position 1 transferred last. As each character is transferred to the processor, all the locations in that memory position are cleared, as also indicated in action box 216. As indicated with decision box 218, the transfer of characters to the processor continues until the rear memory is empty.

When the reader memory is empty and, as indicated with decision box 220, the read-out equipment of FIG. 4 has reached the end of a job, the sequence proceeds to action box 222 and stops. On the other hand, when the end of the job has not been reached, the operation proceeds to action box 224, and the control unit signals the tape transport 156 to again start reading the tape in the forward direction. Thereafter, the operation loops back to action box 196 and proceeds accordingly.

This completes the operation of the FIG. 4 read-out equipment in the event no error is detected. However, with further reference to FIG. 9, when an error is detected as a result of the decisional operation of decision boxes 198 or 208, the reader control unit 174 branches the operating sequence to action box 226 and sets the error flip-flop 184, i.e. places this flip-flop in the set state.

Thereafter, when the reader memory is not full at this juncture, indicated by a no output from decision box 228, the reader control unit 174 commences a sequence of operations that will fill the memory data locations with ZEROS at essentially the same rate at which the reader memory is loaded with characters from the converter 166. The timing of these memory padding operations is made to coincide essentially with the normal reader memory loading operation by the use of the clock 177 in the reader control unit 174, which operates at a rate corresponding to the rate at which data was initially recorded on the tape, and more particularly, at a rate essentially equal to the rate at which information is recorded on the tape divided by the number of digits in a character. This timing relation results in the reader control unit filling the reader memory with ZERO characters at essentially the same rate that the reader memory receives characters from the converter 166 during error-free operation.

More particularly, with continued reference to FIG. 9, the first operation taken after the error flip-flop is set when the reader memory is not full is, as indicated in action box 230, to enable the reader memory to load a ONE into location X100 and to load ZEROS into the data locations of position 100. This operation is followed, action box 232, by a shift reader memory one position to the right operation (abbreviated SHIFT RM). This operation shifts the contents of each reader memory position to the next adjacent position to the right and loads position 100 with the binary levels established by the enable signals of action box 230. This sequence of operations in action boxes 230 and 232 is repeated until the reader memory is full, as determined with decision box 234.

The ensuing operations take place when the reader memory is filled with ZEROS in accordance with action boxes 230 and 232, and also when the reader memory is full at the time when an error is detected, as indicated with an affirmative output from decision box 228.

As indicated in FIG. 9 with action box 236, at this juncture the reader control unit 174 operates the track select switch 164 to read signals from the other track, i.e. track II of the FIG. 1 tape 10 being read, and to feed the signals to the phase decoder 165. The reader control unit 174 then advances to action box 238 and loads the data signals read from track II to the converter 166 one bit at a time, incrementing the bit counter 175 with the loading of each bit.

In the event that an error is detected at this time, as indicated with decision box 240, the read operation halts. This is because the read-out equipment is now re-reading the information which was read just previously from track I and indicated to have an error in it. Thus the detection of an error in the reading of the redundant recording of the same information requires operator attention or further special attention. However, as indicated with a negative output from decision box 240, if no error is detected during the reading of information from track II, the operation proceeds until the bit counter is full, as indicated with an affirmative output from decision box 244.

As indicated with action boxes 246 and 248, at this juncture the reader control unit transfers the character just loaded into the converter to the ready memory by enabling the memory to load the character into the data locations of position 100 and enabling a ONE to be loaded in location X100, after which the control unit 174 shifts the reader memory to effect the character transfer. Also during action box 246, the control unit resets the bit counter 175. The loading of the converter 166 with digits read from track II in accordance with action boxes 238, 240 and 244, and the transfer of the resultant character from the converter to the reader memory in accordance with action boxes 246 and 248 continues until the memory is full, as manifested by an affirmative output from decision box 250.

When the reader memory is full, and barring the detection of an error as would occur due to the continued production of clock pulses by the phase decoder, as indicated with decision box 252 and the halt of action box 254, the reader control unit 174 proceeds to the operations indicated in action box 256. These actions top the movement of the tape and signal the processor 178 that a record is ready for transfer to it. After the processor acknowledges the ready flag, decision box 258, the transfer of characters from the reader memory to the processor commences, as indicated with action box 262. With the transfer of each reader memory character to the processor, which again in the illustrated arrangement proceeds starting with the character in memory position 100, the reader memory locations are cleared after the transfer of the character therein to the processor.

When the memory is empty, as indicated with an affirmative output from decision box 264, the control unit 174 operates the tape transport to move the tape in reverse. The control unit also operates the track select switch, converter 166 and reader memory 170 to read in reverse the track II record which was just read, and to load the characters read in this manner into the reader memory locations, under the control of the timing pulses which the phase decoder 165 produces while the tape is being read in reverse.

The operations indicated in action box 266, which continue until the reader memory is full per decision box 270, are taken in order to provide control for the FIG. 4 equipment to reverse the tape for the length of the track II record that was just read in the forward direction, i.e. to control the rewinding of the tape so that the read-out equipment can resume read-out in track I with the record immediately following the track I record in which an error was just detected. Accordingly, when the reader memory is full, decision box 270, the reader control unit 174 advances to action box 272 and stops the tape, clears the error flip-flop, clears the reader memory, and operates the track select switch 164 to commence reading from track I. At this juncture, the control unit 174 leeps the further operation of the read-out equipment back to the start tape operation of action box 194.

It will thus be seen that in accordance with the flow chart of FIG. 9, the read-out equipment shown in FIG. 4 reads information from a record medium such as a magnetic tape by reading a single track (or set of tracks) of information in a conventional manner and loading the resultant information a character at a time into a reader memory. However, in the event the read-out equipment detects a missing clock pulse during the reading of an information record, or detects spurious or extra clock pulses, no further information obtained from the remainder of the record being read is loaded in the reader memory. Instead, the reader memory, which is a static type memory that functions as a buffer memory, is loaded with ZEROS from a clock in the reader control unit at essentially the same rate at which characters are loaded into the memory during error-free operation. When the reader memory is filled in this manner, which occurs essentially simultaneously with the passage of the end of the error-bearing record that was being read past the read head, the read-out equipment rereads the same information from the redundant recording thereof in the second track (or set of tracks), and loads the information read from the second track into the reader memory 170.

In the event that an error is detected during this read operation, the read-out equipment halts operation pending attention by an operator or the taking of whatever other action is desired. In the event no error is detected during the reading of the redundantly recorded information in the second track, the information is assembled in the reader memory 170 and transferred to the processor or other output device in lieu of the record that was being read from track I at the time the error was sensed.

Thereafter, the read-out equipment reverses the tape and reads the track II record again in the reverse direction in order to control the rewinding of the tape back to the point at which the read-out equipment switched from the first set of tracks to the second set of tracks. Upon completion of this reverse reading in the error-free second track, the read-out equipment resumes conventional reading of successive records in the first track.

Although described principally with reference to a magnetic tape record medium, the invention can equally be practiced with other magnetic records such as cards, disks and even drums. Further, the invention can be practiced with record media other than magnetic, such as punched tape or optical memory records.

One illustration of the changes that can be made in the practice of the invention is that the FIG. 3 memory 24 does not need to store Y information. A separate register can be provided to control in which set of tracks the character in each memory position is to be written. For example, a two-state register, i.e. a flip-flop, can replace the single-bit of Y information recorded in every position of the illustrated memory 24.

Further, more than one bit of Y information can be stored, either in the memory or externally as in a register. In particular, two Y bits per memory position will control the writing of information in four tracks, as in FIG. 2.

The invention can also be used in the recording and reading of information in variable-length blocks. This practice of the invention simply involves tagging the end of each block with a check sum number identifying the block length.

It will thus be seen that the objects set forth above, among those made apparent from the preceding description, are efficiently attained. Since certain changes may be made in the above constructions and in carrying out the above methods, without departing from the scope of the invention, it is intended that all matter contained in the above description or shown in the accompanying drawings shall be interpreted as illustrative rather than in a limiting sense.

It is also to be understood that the following claims are intended to cover all of the generic and specific features of the invention herein described and all statements of the scope of the invention which, as a matter of language, might be said to fall therebetween.

Having described the invention, what is claimed as new and secured by Letters Patent is:

1. Apparatus for recording information on a record medium, said apparatus comprising A. static information storage means for storing information to be recorded on said medium, B. recording means for receiving information from said storage means and for recording it on said medium in any one of first and second sets of one or more tracks, C. control means for operating said storage means and said recording means for delivering information from said storage means to said recording means for recordal in said first set of tracks at a first location on said record medium, and for delivering the same information to said recording means for recordal again in said second set of tracks at a second location that does not include part of said first location but which has a selected spatial relation to said first location, where each said location encompasses record medium storage area in both sets of tracks and D. reading means for reading from any one of said first and second sets of tracks information recorded on said medium; said reading means normally reading information units recorded in only one set of said tracks, determining whether there is an error in the units of information read from said one set of tracks, and reading a unit of information from said second set of tracks in the event an error is detected in the reading of that same information unit from said first set of tracks.

2. Apparatus as defined in claim 1

A. in which said storage means stores first and second units of successively occurring information, and B. in which said control means operates said storage means and said recording means to record a first unit of information at said first location in said first set of tracks, to record said second unit of information at said second location in said first set of tracks, to record again said first unit of information at said second location in said second set of tracks, and to record again said second unit of information in said second set of tracks at a third location that does not include either of said first and second locations.

3. Apparatus for recording information on a recording medium, said apparatus comprising A. static information storage means for successively receiving units of information to be recorded and for storing at least any two successively received information units, B. recording means for receiving information from said storage means and for recording it on a recording medium in any one of first and second sets of one or more tracks, C. control means for operating said storage means and said recording means for storing said unit of information only once in each said set of tracks in the order in which said storage means receives it, and with each unit of information being recorded in each set of tracks at a location that does not include any part of the location at which said same unit of information is recorded in the other set of tracks, where each said location includes record medium storage area in both said sets of tracks; said control means operating said storage means and said recording means for recording each unit of information in said second set of tracks in a location which has a selected and fixed spatial relation relative to the recordal of the same unit of information in said first set of tracks and D. means for reading said information, as so recorded, from said recording medium, said means for reading including record reading apparatus for normally reading units of information from said first set of tracks in the same sequence as recorded, and for reading a unit of information from said second track in the event an error is detected in the reading of that same information unit from said first track.

4. Apparatus according to claim 3 wherein said tracks extend on the record medium side-by-side with each other and wherein each said location includes equal-length side-by-side segments of both sets of tracks.

5. Apparatus according to claim 3 in which said means for reading further includes error-checking means for detecting an error in each information unit read from at least said first set of tracks.

6. Apparatus according to claim 3 in which said recording medium is of the type that is subjected to movement relative to said recording means and to said reading means for the transfer of information therewith in a forward direction extending along said tracks, and further characterized in that said control means operates said storage means and said recording means for recording each unit of information on the record medium in said first set of tracks at a location disposed further along said forward direction than the location at which said same unit of information is recorded in said second set of tracks.

7. Apparatus according to claim 3 in which said control means operates said storage means and said recording means for recording information simultaneously in both said sets of tracks at the same location.

8. Apparatus according to claim 3

A. in which said storage means has first and second sets of storage locations, and B. in which said control means operates said storage means to store a newly received information unit in said first set of locations and to store a previously received information unit in said second set of locations, and, further, to record in said first set of tracks information units stored in said first set of locations, and to record in said second set of tracks information units stored in said second set of locations.

9. Apparatus for reading information from a recording medium, said apparatus comprising A. read-out means for reading information from any one of first and second sets of one or more recording medium tracks, B. information storage means for receiving read-out information from said read-out means and for storing the information, C. control means for operating said read-out means and said storage means for reading information normally from locations successively positioned along one set of tracks and for the storage thereof in said storage means, and in the event an error is detected in the information read from said one set of tracks at a first location, for transferring the read-out to at least one different location of the other set of tracks and for storing the information read therefrom in said storage means, where each said location encompasses record medium storage area in both said sets of tracks.

10. Record reading apparatus according to claim 9 in which said control means operates said storage means to record the information read from said other set of tracks in said one different location in place of the storage of information read from said one set of tracks at said first location.

11. Record reading apparatus according to claim 9

A. further comprising error-detecting means for monitoring signals produced in response to the read-out signals from said read-out means to detect a read-out error condition, and B. in which said control means responds to said detection of an error condition to cause said transfer of the read-out from one set of tracks to another set of tracks.

12. Record reading apparatus according to claim 11 for use with a record storing in each location a first number of information items in each of said first and second sets of tracks, and further characterized in that said control means A. clears said storage means of information items prior to initiating the reading of a location on said record means, B. operates said read-out means and said storage means normally to store in said storage means all of said first number of information items read from a set of tracks in one location, C. stores blank information items in said storage means in lieu of information items read from the record medium in response to said detection of an error condition until the sum of said blank information items and the read-out information items stored in said storage means attains said first number, and D. transfers the read-out of information from the record medium from one set of tracks to the other set of tracks only when said storage means contains a first number of information items.

13. Read-out apparatus according to claim 9 in which said recording medium is of the type that is subjected to movement relative to said read-out means for the transfer of information therewith in a forward direction extending along said tracks, and in which said read-out apparatus is for use with a record medium which stores in each location a first number of information items in each of said first and second sets of tracks, said read-out apparatus being further characterized in that said control means A. operates said read-out means and said storage means to move said record medium in said forward direction for the read-out of information from the record means, and continue to move the record medium in said forward direction in response to detection of a read-out error from within a location until the entirety of that location has been moved in said forward direction past said read-out means, and B. operates said read-out means and said storage means to transfer the read-out of information from one set of tracks to the other set of tracks upon detection of an error only during the passage by said read-out means of an interlocation space on said record medium.

14. Apparatus for recording digital information on a magnetic tape or like record medium with the recorded information being organized in records, each of which is recorded in a block of the record medium and which is spaced from a successive record by an inter-record gap, said apparatus comprising A. buffer memory means for storing first and second records of information characters successively received from an information source, with the characters of the last-received record being stored in a first set of memory locations and with the characters of the previously received record being stored in a second set of memory locations, B. recording means for receiving information from said memory means and for recording the information on said record medium in any one of first and second sets of recording tracks, each set of which has at least one track, C. control means 1. connected with said memory means and with said recording means,
2. operating said memory means to store a record of characters successively received from the source in successively ordered locations of said first set thereof,
3. operating said memory means and said recording means to record the record of characters stored in said second set of memory locations in said second set of tracks at a first block,
4. operating said memory means and said recording means to record the record of characters stored in said first set of memory locations in said first set of tracks at a block spatially associated on said medium with said first block for essentially simultaneous parallel read-out from the associated blocks, and for restoring the record of characters recorded in said first set of tracks in said second set of memory locations.

D. read-out means for reading information from any of said first and second sets of tracks and producing character-identifying information signals in response thereto, E. error-detecting means for monitoring read-out signals from said read-out means to detect a read-out error condition, and F. control means for operating said read-out means normally to read successively-recorded information from said first set of tracks, and responding to the detection of an error condition by said error-detecting means to transfer the read-out of the record medium from said first set of tracks to said second set of tracks.

15. Apparatus for reading digital information from a magnetic tape or like record medium having multiple-character records of information recorded therein each in a block of the record medium and which is spaced from the adjacent blocks by an inter-record gap, and having said information recorded in each of first and second sets of tracks, with each set having at least one track, said apparatus comprising A. read-out means for reading information from any one of said first and second sets of tracks and producing character-identifying information signals in response thereto, B. buffer storage means connected with said read-out means for storing a record of characters read from the record medium, C. error-detecting means for monitoring signals produced in response to the read-out signals from said read-out means to detect a read-out error condition, and D. control means 1. connected with said read-out means, said storage means, and said error-detecting means,
2. for operating said read-out means and said storage means normally to read successively recorded information from said first set of tracks and to store the resultant characters in said storage means, 3. responding to the detection of an error condition by said error-detecting means to store blank characters in said storage means in lieu of read-out characters and at substantially the same rate as read-out characters are normally loaded into said memory means until said memory means contains a full record of read-out and blank characters, and 4. transferring the read-out of the record medium from said first set of tracks to said second set of tracks upon the detection of a read-out error condition only at a time when said memory means is full.

16. Record reading apparatus as defined in claim 15 further characterized in that said control means operates said read-out means and said memory means successively to read a single record of information from said second set of tracks and to store the read-out characters produced in response thereto in said memory means, and to transfer the read-out of recorded information back to said first set of tracks starting with the first record immediately following the record in which the read-out error was detected.

17. Record reading apparatus as defined in claim 16 further characterized in that subsequent to reading a record from said second set of tracks, said control means operates said read-out means and said memory means to read in reverse the same record from said second set of tracks, thereby to ready the reading of successive records from the said first set of tracks.

* * * * *

UNITED STATES PATENT OFFICE

CERTIFICATE OF CORRECTION

Patent No. 3,761,903 Dated September 25, 1973

Inventor(s) George L. Bird, Jr. and Way Dong Woo

It is certified that error appears in the above-identified patent and that said Letters Patent are hereby corrected as shown below:

Column 2, line 55, after "FIGS. 5 A and B" change "is" to --are--.

Column 2, line 58, after "FIGS. 6 A through L" change "shows" to --show--.

Column 2, line 64, after "FIGS. 8 A through H" change "shows" to --show--.

Column 2, line 67, after "FIGS. 9 A and B" change "is" to --are--.

Column 3, line 23, "tap" should be --tape--.

Column 6, line 42, "locat6ons" should be --locations--.

Column 9, line 29, "be" should be --by--.

Column 10, line 2, "recrod" should be --record--.

Column 11, line 5, after "ZEROS" delete "and".

Column 17, line 3, "top" should be --stop--.

Signed and sealed this 26th day of November 1974.

(SEAL)
Attest:

McCOY M. GIBSON JR.
Attesting Officer

C. MARSHALL DANN
Commissioner of Patents